United States Patent
Park et al.

(10) Patent No.: US 7,691,501 B2
(45) Date of Patent: Apr. 6, 2010

(54) FUEL CELL SYSTEM AND CONTROLLING METHOD THEREOF

(75) Inventors: Myung-Seok Park, Gyeongsangnam-Do (KR); Hong Choi, Gyeongsangnam-Do (KR); Kyu-Jung Kim, Gyeonggi-Do (KR); Myeong-Ho Lee, Busan (KR); Cheol-Hwan Kim, Gyeongsangnam-Do (KR); Yong-Jun Hwang, Gyeongsangnam-Do (KR); Seung-Tae Ko, Daegu (KR); Seong-Geun Heo, Busan (KR); Tae-Hee Cho, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 444 days.

(21) Appl. No.: 11/572,529

(22) PCT Filed: Aug. 17, 2004

(86) PCT No.: PCT/KR2004/002057

§ 371 (c)(1),
(2), (4) Date: Jan. 23, 2007

(87) PCT Pub. No.: WO2006/019198

PCT Pub. Date: Feb. 23, 2006

(65) Prior Publication Data

US 2008/0003469 A1      Jan. 3, 2008

(51) Int. Cl.
*H01M 16/00* (2006.01)
*H01M 8/06* (2006.01)

(52) U.S. Cl. .............. 429/9; 429/17; 429/21; 429/22

(58) Field of Classification Search .......... 429/9, 429/17, 19, 21, 22
See application file for complete search history.

(56) References Cited

U.S. PATENT DOCUMENTS

| | | | |
|---|---|---|---|
| 3,511,710 A | * | 5/1970 | Jung et al. ............ 429/15 |
| 6,001,499 A | | 12/1999 | Grot et al. |
| 6,982,128 B2 | * | 1/2006 | Tsang et al. ........... 429/19 |

(Continued)

FOREIGN PATENT DOCUMENTS

EP      1 369 947      * 12/2003

(Continued)

OTHER PUBLICATIONS

English Language Abstract of KR 10-2004-0003658, doc date Jan. 2004).

(Continued)

*Primary Examiner*—Stephen J. Kalafut
(74) *Attorney, Agent, or Firm*—KED & Associates, LLP

(57) ABSTRACT

A fuel cell system comprises: a fuel storage means for storing a fuel; a direct borohydride fuel cell (DBFC); a fuel circulation supply means for circulation and supplying a fuel to an anode of the DBFC from the fuel storage means; a polymer electrolyte membrane fuel cell (PEMFC) for receiving hydrogen generated at the anode of the DBFC as a fuel; a hydrogen control means for controlling hydrogen generated from the anode of the DBFC in correspondence to an amount required by the PEMFC and thereby supplying the hydrogen to the PEMFC; and an air supply means for supplying air to a cathode of the DBFC and an cathode of the PEMFC.

28 Claims, 6 Drawing Sheets

U.S. PATENT DOCUMENTS

| | | | |
|---|---|---|---|
| 7,241,521 B2 * | 7/2007 | Luo et al. | 429/17 X |
| 2003/0143443 A1 | 7/2003 | Tsang et al. | |
| 2003/0190504 A1 | 10/2003 | Fisher et al. | |
| 2003/0235748 A1 | 12/2003 | Haltiner, Jr. et al. | |
| 2007/0048570 A1 | 3/2007 | Ko et al. | |
| 2007/0048581 A1 | 3/2007 | Hwang et al. | |
| 2007/0054161 A1 | 3/2007 | Hwang et al. | |

FOREIGN PATENT DOCUMENTS

| | | |
|---|---|---|
| JP | 49-7699 | 2/1974 |
| KR | 10-2004-0003658 | 1/2004 |

OTHER PUBLICATIONS

U.S. Appl. No. 11/538,171 to Ryoo et al., filed Oct. 3, 2006.
U.S. Appl. No. 11/548,773 to Park et al., filed Oct. 12, 2006.
U.S. Appl. No. 11/572,539 to Park et al., filed Jan. 23, 2007.
U.S. Appl. No. 11/469,644 to Hwang et al., filed Sep. 1, 2006.
U.S. Appl. No. 11/572,545 to Park et al., filed Jan. 23, 2007.

* cited by examiner

[Fig. 1]
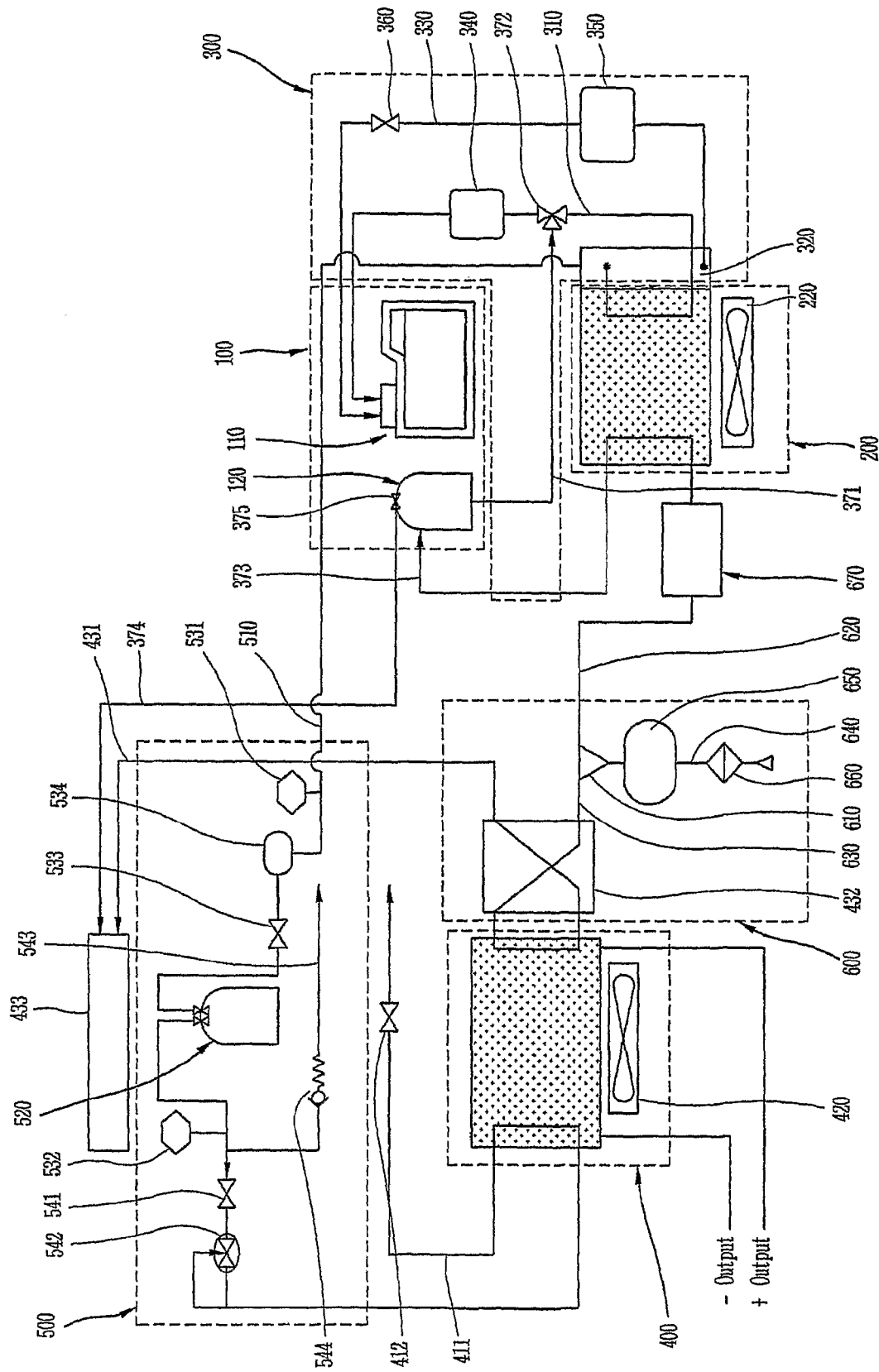

[Fig. 2]
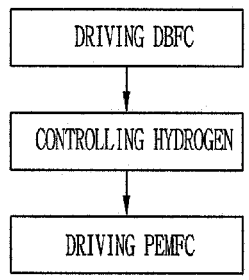
[Fig. 3]
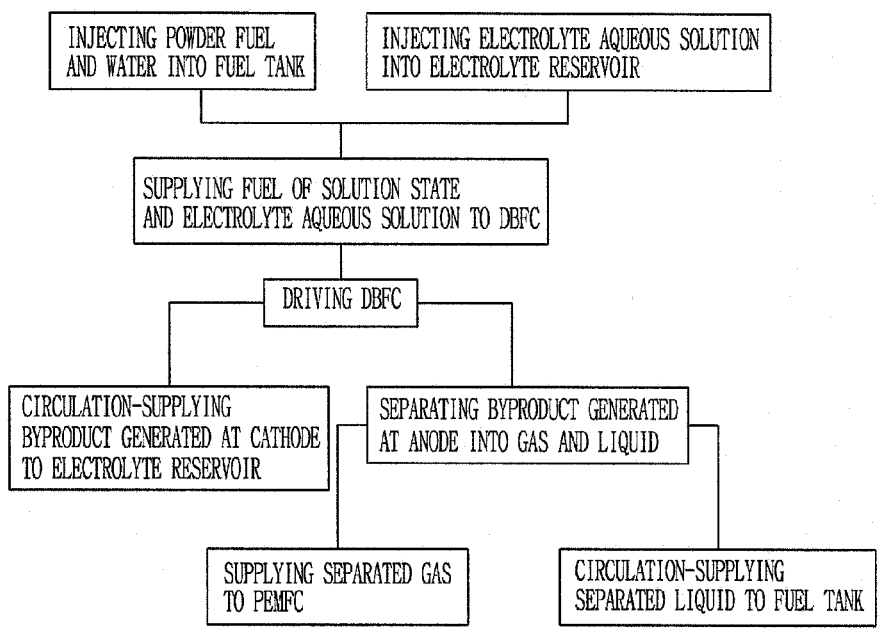
[Fig. 4]
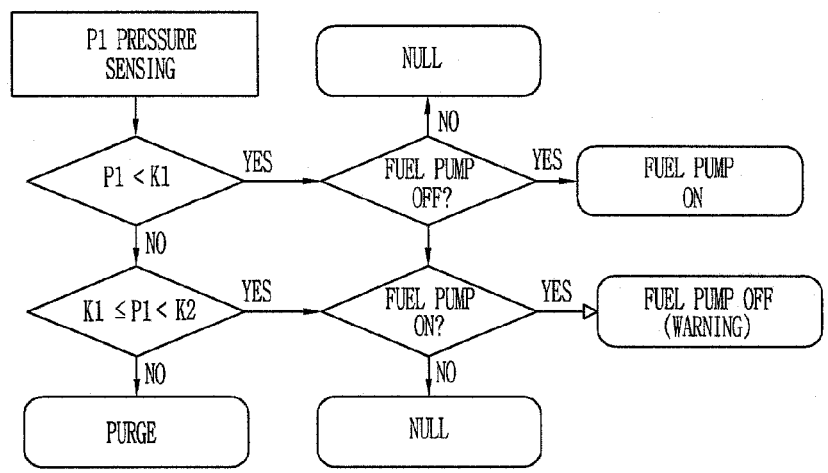

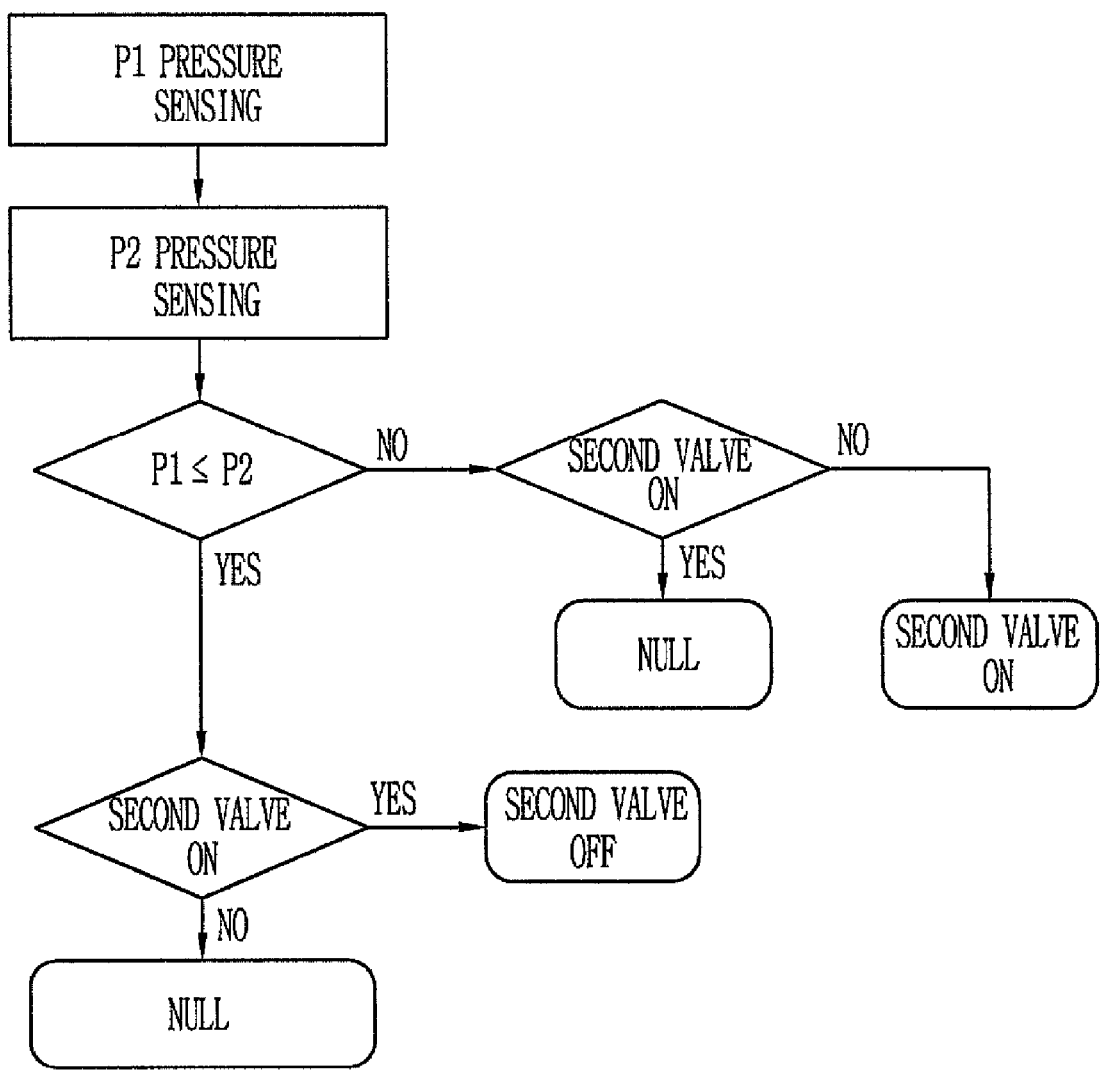
[Fig. 5]

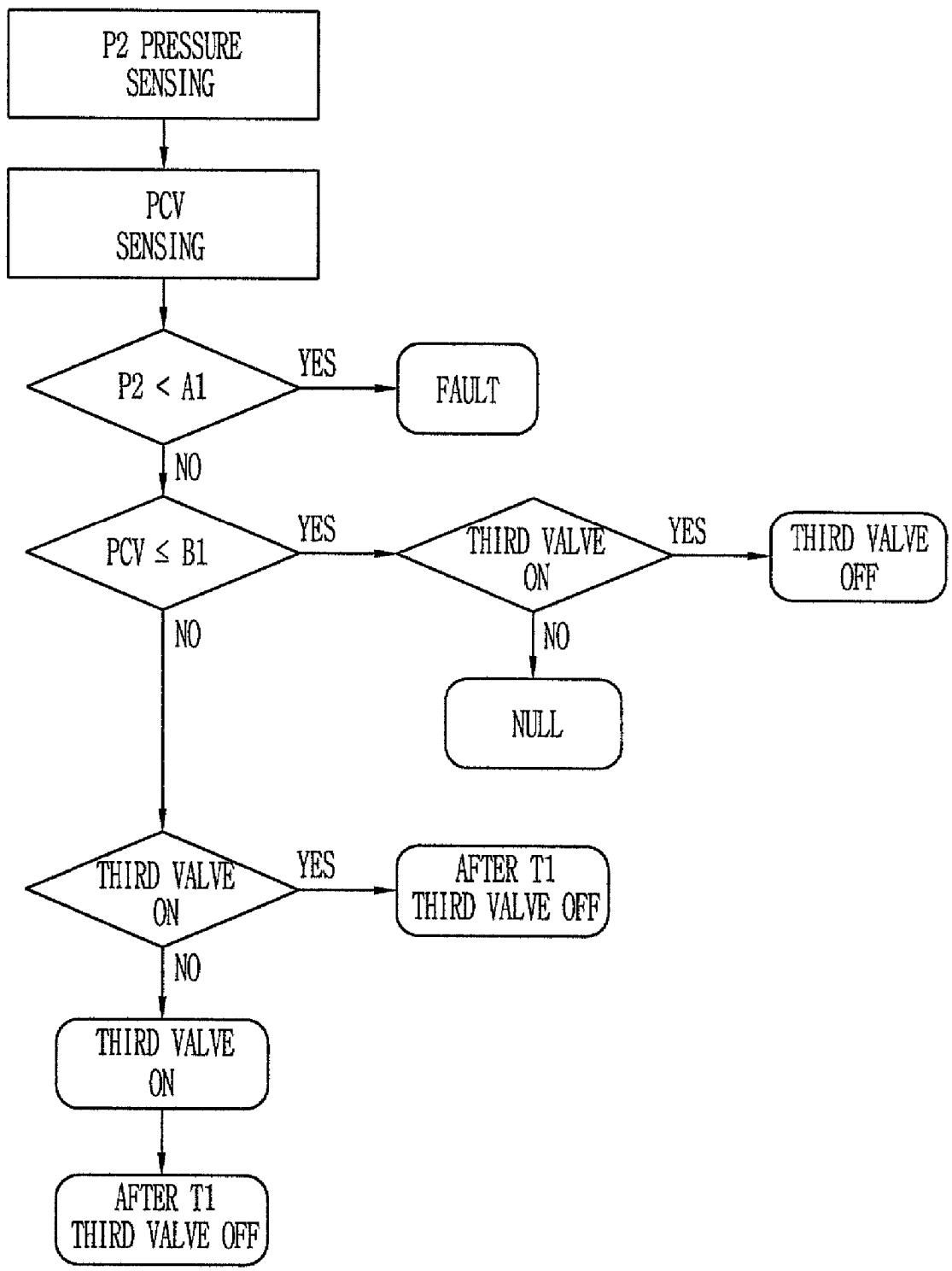
[Fig. 6]

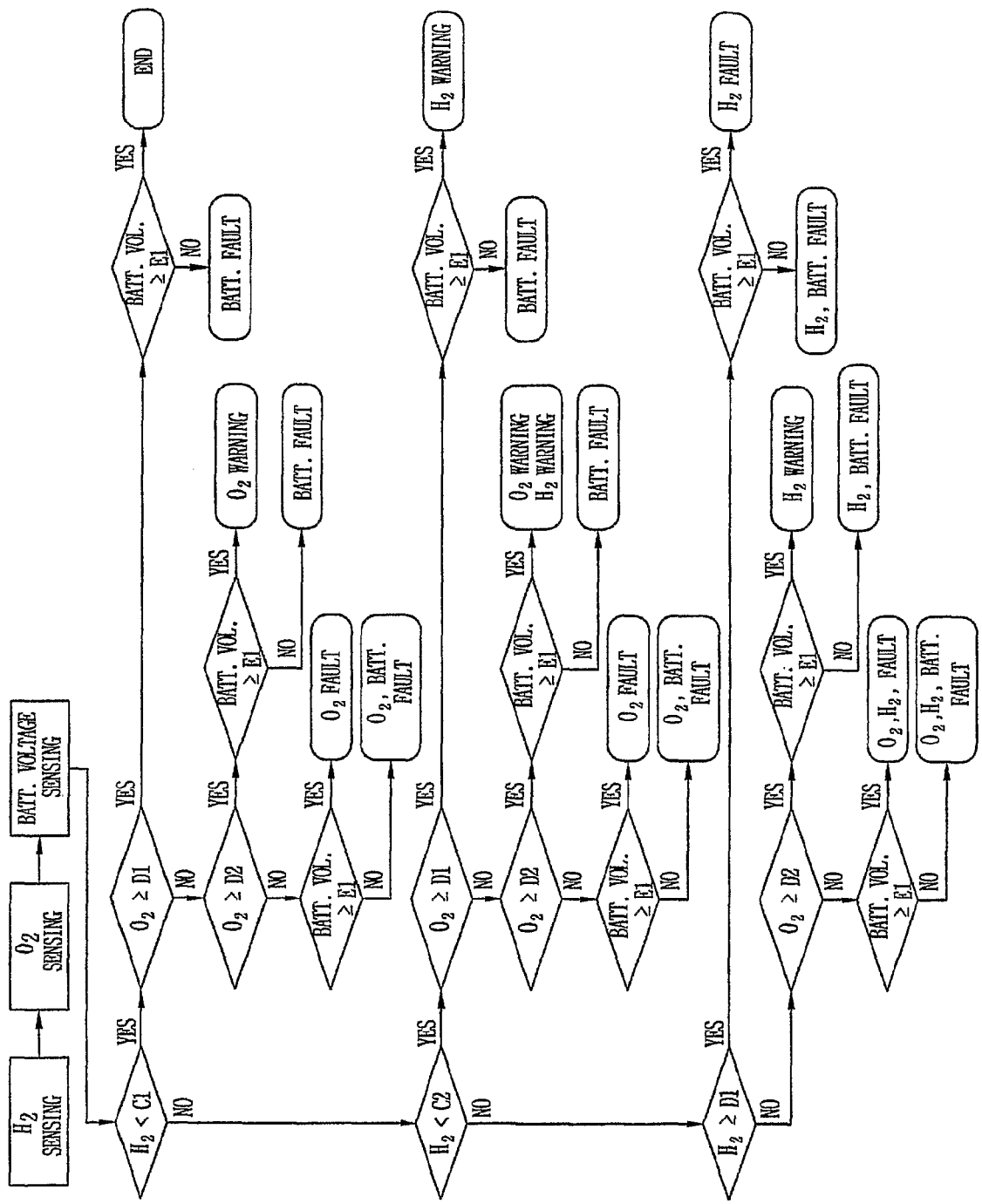
[Fig. 7]

[Fig. 8]
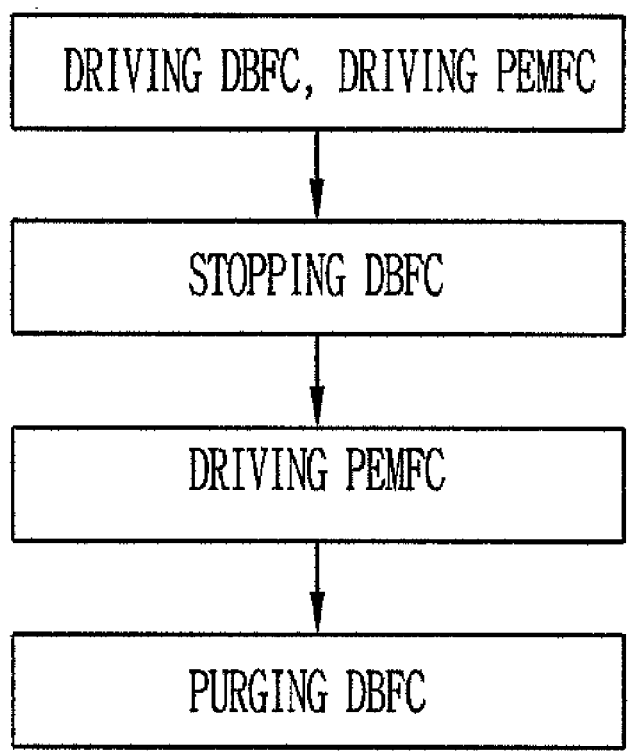

FUEL CELL SYSTEM AND CONTROLLING METHOD THEREOF

TECHNICAL FIELD

The present invention relates to a fuel cell system and a controlling method thereof, and more particularly, to a fuel cell system capable of maximizing an output of electric energy and enhancing a stability of a system by efficiently using a fuel, and a controlling method thereof.

BACKGROUND ART

A fuel cell is being developed as a replacement of a fossil fuel that is not eco-friendly. The fuel cell is a generating device for directly converting chemical energy into electric energy. A hydrogen-including fuel and an oxygen-including air are continuously supplied to the fuel cell, in which the hydrogen and the oxygen are electrochemically reacted to each other. The fuel cell directly converts an energy difference between before the reaction and after the reaction into electric energy. The fuel cell is continuously provided with a fuel and oxygen thereby to continuously generate electric energy.

The fuel cell includes a phosphoric acid fuel cell, an alkaline fuel cell, a proton exchange membrane fuel cell, a molten carbonate fuel cell, a solid oxide fuel cell, a direct methanol fuel cell, etc. Said fuel cells are operated by the same principle, and are classified according to a kind of a used fuel, a driving temperature, a catalyst, etc.

Also, the fuel cell is being developed to be applied variously as a domestic fuel cell for supplying electricity to a home, a fuel cell used in an electricity car, a fuel cell used in a mobile terminal or a notebook computer, a fuel cell movable at home and supplying electricity, etc.

Especially, a fuel cell for operating home electronics or other electric devices by being moved at home or at an outdoors has to be minimized in order to be conveniently portable, and has to maximize an output of electric energy under a state that the size thereof is limited. Also, a stability of the fuel cell has to be obtained.

DISCLOSURE OF INVENTION

Therefore, it is an object of the present invention to provide a fuel cell system capable of maximizing an output of electric energy and having a compactification of an entire structure by efficiently using a fuel, and a controlling method thereof.

Another object of the present invention is to provide a fuel cell system capable of enhancing a stability of a system.

To achieve these objects, there is provided a fuel cell system comprising: a fuel storage means for storing a fuel; a DBFC; a fuel circulation supply means for circulation-supplying a fuel to an anode of the DBFC from the fuel storage means; a PEMFC for receiving hydrogen generated from the anode of the DBFC as a fuel; a hydrogen control means for controlling hydrogen generated from the anode of the DBFC in correspondence to an amount required by the PEMFC and thereby supplying the hydrogen to the PEMFC; and an air supply means for supplying air to a cathode of the DBFC and a cathode of the PEMFC.

To achieve these objects, there is also provided a method for controlling a fuel cell system comprising the steps of: driving a DBFC; controlling hydrogen, a byproduct generated at an anode of the DBFC after a reaction as a preset amount; and driving a PEMFC by receiving hydrogen having an amount set in the hydrogen controlling step and thus by using the hydrogen as a fuel.

DESCRIPTION OF DRAWINGS

FIG. 1 is a piping diagram showing one embodiment of a fuel cell system according to the present invention;

FIG. 2 is a flow chart showing a controlling method of a fuel cell system according to the present invention;

FIG. 3 is a flow chart showing a step of driving a DBFC in the controlling method of a fuel cell system according to the present invention;

FIG. 4 is a flow chart showing a step of controlling a generation of hydrogen in the controlling method of a fuel cell system according to the present invention;

FIGS. 5 and 6 are flow charts respectively showing a step of controlling hydrogen in the controlling method of a fuel cell system according to the present invention;

FIG. 7 is a flow chart showing a safe control algorithm in the controlling method of a fuel cell system according to the present invention; and FIG. 8 is a flow chart showing a step of stopping the system in the controlling method of a fuel cell system according to the present invention.

BEST MODE

Hereinafter, a fuel cell system according to the present invention will be explained with reference to the attached drawings.

FIG. 1 is a piping diagram showing one embodiment of a fuel cell system according to the present invention.

As shown, the fuel cell system according to the present invention comprises: a fuel storage means for storing a fuel 100; a DBFC 200; a fuel circulation supply means 300 for circulation-supplying a fuel from the fuel storage means 100 to an anode of the DBFC 200; a PEMFC 400 for receiving hydrogen generated from the anode of the DBFC 200 as a fuel; a hydrogen control means 500 for controlling hydrogen generated from the anode of the DBFC 200 in correspondence to an amount required by the PEMFC 400 and thereby supplying the hydrogen to the PEMFC 400; and an air supply means 600 for supplying air to a cathode of the DBFC 200 and a cathode of the PEMFC 400.

The fuel storage means 100 includes: a fuel tank 110 for inputting a power fuel and water; and an electrolyte reservoir 120 for containing electrolyte aqueous solution. As the power, one of $NaBH_4$, $KBH_4$, $LiAlH_4$, KH, NaH, etc. is used. Also, as the electrolyte aqueous solution, one of KOH and NaOH is used.

The DBFC 200 includes: an anode where a fuel is electrochemically oxidized; and a cathode where ion oxidized in the anode and oxygen in the air are electrochemically deoxidized. The DBFC 200 has a well-known general structure.

The fuel circulation supply means 300 includes: a first line 310 for connecting the fuel tank 110 and the anode of the DBFC 200; a gas/liquid separator 320 for separating a byproduct generated at the anode of the DBFC 200 after a reaction into gas and liquid; a second line 330 for connecting the gas/liquid separator 320 and the fuel tank 110 and thereby guiding a liquid byproduct of the gas/liquid separator 320 to the fuel tank 110; a fuel pump 340 mounted at the first line 310; a recycle pump 350 mounted at the second line 330; and an electrolyte supply means for supplying an electrolyte to the anode of the DBFC 200.

The second line 330 positioned between the recycle pump 350 and the fuel tank 110 is provided with a first valve 360 for preventing a fluid of the fuel tank 110 from backwardly flowing to the gas/liquid separator 320 when the recycle pump 350 is stopped.

A filter (not shown) for filtering a solidified byproduct is mounted at the second line 330 or at the fuel tank 110.

The electrolyte supply means includes: a third line 371 for connecting the electrolyte reservoir 120 and the first line 310; a three-way valve 372 mounted at a portion that the first line 310 and the third line 371 are connected to each other, for controlling a flow direction of a fluid; and a fourth line 373 for connecting an outlet of the cathode of the DBFC 200 and the electrolyte reservoir 120.

One side of the third line 371 is connected to the first line 310 positioned between the DBFC 200 and the fuel pump 340 at an arbitrary position. Another side of the third line 371 is connected to a lower surface of the electrolyte reservoir 120. Also, one side of the fourth line 373 is connected to an upper portion of the electrolyte reservoir 120.

A first discharge line 374 for discharging gas contained in the electrolyte reservoir 120 is connected to an upper portion of the electrolyte reservoir 120. Also, a first purge valve 375 for controlling an inner pressure of the electrolyte reservoir 120 by opening and closing the first discharge line 374 is provided at the upper portion of the electrolyte reservoir 120. When a water level of liquid contained in the electrolyte reservoir 120 is more than a preset value, the first purge valve 375 is closed thus to close the electrolyte reservoir 120. As the electrolyte reservoir 120 is closed, an inner pressure thereof is increased by gas contained therein. Also, by the inner pressure, the liquid contained in the electrolyte reservoir 120 is discharged through the third line 371.

As a modification example of the fuel storage means 100, the electrolyte 120 and the fuel tank 110 can be constituted as one, in which a power fuel, water, and the electrolyte aqueous solution can be contained.

The PEMFC 400 is composed of: an anode where hydrogen generated from the DBFC 200 is electrochemically oxidized; and a cathode where ion oxidized in the anode and oxygen in the air are electrochemically deoxidized. The PEMFC 400 has a well-known general structure.

The hydrogen control means 500 includes: a connection line 510 for connecting a gas/liquid separator 320 constituting the fuel circulation supply means 300 and the anode of the PEMFC 400, and flowing hydrogen generated after a reaction to the PEMFC 400; a hydrogen reservoir 520 mounted at the connection line 510, for temporarily storing hydrogen; a main gas valve unit mounted at the connection line 510 between the hydrogen reservoir 520 and the PEMFC 400, for controlling a hydrogen pressure as a certain degree so that hydrogen of the hydrogen reservoir 520 can be supplied to the cathode of the PEMFC 400 with a certain amount; and a hydrogen conduit open/close unit for allowing/shielding a hydrogen flow into the hydrogen reservoir 520 by a pressure difference between inside of the connection line 510 positioned at an inlet of the hydrogen reservoir 520 and inside of the connection line 510 positioned at an outlet of the hydrogen reservoir 520.

The hydrogen conduit open/close unit includes: a first pressure sensor 531 mounted at the connection line 510 positioned between the gas/liquid separator 320 and the hydrogen reservoir 520, for sensing a pressure; a second pressure sensor 532 mounted at the connection line 510 between the main gas valve unit and the hydrogen reservoir 520, for sensing a pressure; a second valve 533 mounted at the connection line 510 between the first pressure sensor 531 and the hydrogen reservoir 520, for controlling hydrogen flowing in the connection line 510; and a control means (not shown) for opening and closing the second valve 533 by a pressure difference detected by the first and second pressure sensors 531 and 532.

The connection line 510 positioned between the first pressure sensor 531 and the second valve 533 can be provided with a first compressor 534 for compression-pumping hydrogen.

The main gas valve unit includes: a third valve 541 mounted at the connection line 510 between the hydrogen reservoir 520 and the PEMFC 400, for controlling a flow amount of hydrogen; a regulator 542 mounted at the connection line 510 between the third valve 541 and the PEMFC 400, for supplying hydrogen of a certain pressure to the anode of the PEMFC 400; a second discharge line 543 connected to the connection line 510 between the hydrogen reservoir 520 and the third valve 541; and a relief valve 544 mounted at the second discharge line 543, for discharging a pressure outwardly when an excessive pressure is applied.

A third discharge line 411 for discharging a byproduct after a reaction is connected to an outlet of the anode of the PEMFC 400, and a second purge valve 412 is mounted at the third discharge line 411.

The air supply means 600 includes: an air distributor 610 for distributing air; a first distribution line 620 for connecting the air distributor 610 and the cathode of the DBFC 200; a second distribute line 630 for connecting the air distributor 610 and the cathode of the PEMFC 400; an air introducing line 640 connected to the air distributor 610, for introducing external air to the air distributor 610; a second compressor 650 mounted at the air introducing line 640, for compression-pumping external air; and an air filter 660 mounted at the air introducing line 640, for filtering introduced air.

A fourth discharge line 431 for discharging a byproduct generated at the cathode after a reaction is connected to an outlet of the cathode of the PEMFC 400. Also, a humidity exchanger 432 for performing a humidity exchange between air introduced into the cathode and a byproduct discharged to outside is connected between the fourth discharge line 431 and the second distribution line 630.

An evaporator 433 for evaporating water discharged from the fourth discharge line 431 is provided at the fourth discharge line 431. The evaporator 433 also evaporates water discharged from the first discharge line 374.

A humidity supply means 670 for supplying humidity to air introduced into the first distribution line 620 is provided at the first distribution line 620. The humidity supply means 670 provided with an additional water tank (not shown) and a humidifier (not shown) can be mounted at the first distribution line 620. Also, as the humidity means 670, the humidity exchanger 432 can be connected to the first distribution line 620.

An unexplained reference numeral 220 denotes a cooling fan of the DBFC, and 420 denotes a cooling fan of the PEMFC.

FIG. 2 is a flow chart showing a controlling method of a fuel cell system according to the present invention, in which the same reference numerals were given to the same parts as those of FIG. 1.

As shown, the method for controlling a fuel cell system according to the present invention comprises the steps of: driving a DBFC 200; controlling hydrogen that is a byproduct generated at an anode of the DBFC 200 after a reaction as a preset amount; and driving a PEMFC 400 by receiving hydrogen having an amount set in the hydrogen controlling step and thus by using the hydrogen as a fuel.

As shown in FIG. 3, in the step of driving a DBFC, the step of supplying a fuel to an anode of the DBFC 200 includes the steps of: making a fuel of an aqueous solution in a fuel tank 110 by injecting a power fuel and water thereto; containing electrolyte aqueous solution in an electrolyte reservoir 120; pumping the fuel of an aqueous solution and thereby supplying to the anode of the DBFC 200 with the electrolyte aqueous solution; separating a byproduct generated at the anode after a reaction into gas and liquid; and pumping the separated liquid and thereby circulation-supplying to the fuel tank 110.

The step of containing an electrolyte in the electrolyte reservoir 120 can be performed prior to the step of containing a fuel in the fuel tank 110. As the fuel, one of $NaBH_4$, $KBH_4$, $LiAlH_4$, KH, NaH, etc. is used. Also, as the electrolyte aqueous solution, one of KOH and NaOH is used.

In the step of driving the DBFC 200, a byproduct generated at a cathode of the DBFC 200 after a reaction is supplied to the electrolyte reservoir 120 thus to be separated into gas and liquid. Also, the electrolyte of the electrolyte reservoir 120 is supplied to the anode of the DBFC when the DBFC is operated, and closes the electrolyte reservoir 120 when the DBFC is stopped. As the electrolyte reservoir 120 is closed, the byproduct contained in the electrolyte reservoir 120 is introduced into the fuel tank 110 by a pressure of the electrolyte reservoir 120.

Also, when a water level of liquid contained in the electrolyte reservoir 120 is more than a preset value, a flow conduit of the electrolyte aqueous solution is converted by controlling a direction of a three-way valve 372 thus to forcibly introduce the liquid of the electrolyte reservoir 120 into the fuel tank 110.

External air is introduced into one conduit and then the air conduit is diverged into two conduits, through which air is respectively supplied to the cathode of the DBFC 200 and the cathode of the PEMFC 400.

In the step of driving the DBFC 200, an amount of hydrogen generated at the cathode of the DBFC 200 after a reaction can be controlled by a supply amount of a fuel supplied to the anode. That is, as shown in FIG. 4, a pressure of hydrogen generated at the DBFC 200 is measured. If the measured pressure is less than a first preset value K1, a fuel is continuously supplied to the anode of the DBFC 200. Also, if the measured value is more than a second preset value K2 greater than the first preset value K1, a fuel supply to the anode of the DBFC 200 is stopped and then the hydrogen is purged. Also, if the measured value is between the first preset value K1 and the second preset value K2, a hydrogen supply is stopped. The hydrogen supply is performed by a fuel pump 340.

A hydrogen amount generated at the DBFC 200 is influenced by a temperature of a stack constituting the anode and the cathode of the DBFC 200 and a fuel concentration. Therefore, in the conventional art, a hydrogen generation amount was controlled by cooling the stack by a fan, which was not performed fast. According to this, in the present invention, a hydrogen generation amount is controlled by controlling a pumping amount of the fuel pump 340 for supplying hydrogen to the anode of the DBFC 200, thereby controlling a hydrogen generation amount fast and thus enhancing a system stability.

As shown in FIG. 5, the step of controlling hydrogen includes the steps of: respectively measuring an inlet pressure P1 and an outlet pressure P2 of a hydrogen reservoir 520, the inlet for introducing hydrogen generated at the anode of the DBFC 200 and the outlet for supplying the introduced hydrogen to the anode of the PEMFC 400; comparing the inlet pressure P1 with the outlet pressure P2; continuously supplying hydrogen generated at the anode of the DBFC 200 to the hydrogen reservoir 520 by opening a second valve 533 for opening and closing a hydrogen conduit when the P1 is greater than the P2, and shielding a hydrogen supply to the hydrogen reservoir 520 when the P1 is less than the P2.

As shown in FIG. 6, the step of controlling hydrogen includes the steps of: measuring the outlet pressure P2 of the hydrogen reservoir 520, the outlet for supplying hydrogen generated at the anode of the DBFC 200 and introduced into the inlet of the hydrogen reservoir to the anode of the PEMFC 400; and measuring a purge cell voltage (PCV) of the PEMFC 400. When the outlet P2 is less than a preset value A1, a hydrogen supply from the hydrogen reservoir 520 to the PEMFC 400 is shielded by closing a third valve 541 for opening and closing a hydrogen conduit for flowing hydrogen from the hydrogen reservoir 520 to the PEMFC 400. Also, when the outlet pressure P2 is more than the preset value A1, a value V of the PCV is compared with a preset value B1. If the value V of the PCV is greater than the preset value B1, a hydrogen supply from the hydrogen reservoir 520 to the PEMFC 400 is shielded. Also, when the value V of the PCV is less than or the same as the preset value B1, a hydrogen supply from the hydrogen reservoir 520 to the PEMFC 400 is shielded after a preset time T1 lapses.

The fuel cell system is provided with a sensor for sensing an oxygen concentration and a hydrogen concentration, thereby measuring an oxygen concentration and a hydrogen concentration during an operation thereof. Also, a charged value of a supplementary battery for charging electric energy is measured. By measuring the oxygen concentration, the hydrogen concentration, and the charged value of the supplementary battery, a stability of the system is increased.

FIG. 7 is a view showing one embodiment of a method for enhancing a system stability by measuring an oxygen concentration, a hydrogen concentration, and a charged value of the supplementary battery.

Referring to FIG. 7, a hydrogen concentration is set on the basis of a first preset value C1 and a second preset value C2 greater than the C1, and an oxygen concentration is set on the basis of a first preset value D1 and a second preset value D2 less than the D1. Also, a preset charged value E1 of the supplementary battery is defined. Then, a hydrogen concentration is measured thus to be judged whether the measured value is more than the C1 or more than the C2, and an oxygen concentration is measured thus to be judged whether the measured value is more than the D1 or more than the D2. Also, a charged value of the supplementary battery is measured thus to be compared with the preset value E1. According to a dangerous degree of the measured value, a warning is performed visually or auditorily, or the system is stopped.

Another example, the oxygen concentration and the hydrogen concentration are respectively measured. When the measured oxygen concentration is less than the first preset value, a warning is performed visually or auditorily, and when the measured oxygen concentration is less than the second preset value, the system is stopped. Also, when the hydrogen concentration is more than the first preset value, a warning is performed visually or auditorily, and when the measured hydrogen concentration is more than the second preset value, the system is stopped.

Then, a charged value of the supplementary battery is additionally measured. When the measured value is more than the preset value E1, a charging is stopped. The charged value of the battery can be judged on the basis of two preset values.

As shown in FIG. 8, the step of stopping the fuel cell system during operation includes the steps of: stopping the DBFC 200 and driving the PEMFC 400 by hydrogen remaining between the DBFC 200 and the PEMFC 400; purge-driving for recollecting a fuel, a byproduct, etc. remaining between the DBFC 200 and the fuel tank 110 to the fuel tank 110 by electric energy generated from the PEMFC 400; continuously driving the PEMFC 400 when a measured amount of hydrogen remaining between the DBFC 200 and the PEMFC 400 is more than a preset value and charging the supplementary battery with the electric energy, and stopping the PEMFC 400 when the measured amount of hydrogen is less than or the same as the preset value.

In the step of stopping the PEMFC 400, the PEMFC 400 is stopped after being generated for a preset time in order to completely consume the remaining hydrogen.

When the purge-driving is not completely performed due to a deficiency of remaining hydrogen while the PEMFC is operated, the supplementary battery is used.

Hereinafter, the fuel cell system and the controlling method thereof according to the present invention will be explained as follows.

First, a fuel and electrolyte aqueous solution are respectively supplied to the anode of the DBFC 200 from the fuel tank 110 and the electrolyte reservoir 120 constituting the fuel storage means 100. At the same time, as the second compressor 650 constituting the air supply means 600 is operated, external air is supplied to the cathode of the DBFC 200. Herein, a fuel of the fuel tank 110 is supplied to the anode through the first line 310, and the electrolyte aqueous solution is supplied to the anode through the third line 371, the three-way valve 372, and the first line 310. The external air is supplied to the cathode through the first distribution line 620 via the air filter 660 and the air distributor 610.

The fuel and the air respectively supplied to the anode of the cathode of the DBFC 200 are electrochemically reacted thus to generate electric energy at the DBFC 200. After the reaction, a byproduct including hydrogen is generated at the anode, and a byproduct including electrolyte aqueous solution is generated at the cathode.

The hydrogen-including byproduct generated at the anode is separated into hydrogen and liquid by the gas/liquid separator 320, and the separated liquid is introduced into the fuel tank 110 through the second line 330 by a pumping force of the recycle pump 350. Also, the separated hydrogen is supplied to the PEMFC 400 through the connection line 510.

The electrolyte aqueous solution-including byproduct is introduced into the electrolyte reservoir 120 through the fourth line 373.

In said process, a circulation supply of the fuel is repeated thereby to generate electric energy at the DBFC 200.

An amount of the hydrogen generated at the anode of the DBFC 200 and supplied to the PEMFC 400 through the connection line 510 is controlled by the hydrogen control means in correspondence of an amount required by the PEMFC 400, thereby being supplied to the anode of the PEMFC 400. Said process will be explained in more detail as follows.

First, hydrogen generated at the anode of the DBFC 200 is stored in the hydrogen reservoir 520 through the connection line 510, and the stored hydrogen is supplied to the anode of the PEMFC 400 through the connection line 510. In said process, the first pressure sensor 531 and the second pressure sensor 532 respectively positioned at the inlet and the outlet of the hydrogen reservoir 520 respectively check a pressure of the inlet of the hydrogen reservoir 520 and a pressure of the outlet of the hydrogen reservoir 520. When a pressure detected by the first pressure sensor 531 is greater than a pressure detected by the second pressure sensor 532, the second valve 533 is opened. On the contrary, when a pressure detected by the first pressure sensor 531 is less than a pressure detected by the second pressure sensor 532, the second valve 533 is closed. According to this, hydrogen inside the hydrogen reservoir 520 is prevented from flowing into the DBFC 200.

When a pressure of the second pressure sensor 532 positioned at the outlet of the hydrogen reservoir 520 is less than a preset value, the third valve 541 is closed. On the contrary, a pressure of the second pressure sensor 532 is more than a preset value, the third valve 541 is opened. Under this state, a PCV of the PEMFC 400 is measured. If the measured PCV is greater than a preset value, the third valve 541 is closed thus to shield a hydrogen supply from the hydrogen reservoir 520 to the PEMFC 400. On the contrary, if the measure PCV is less than or the same as a preset value, the third valve 541 is closed after a preset time lapses.

As said process is repeated, hydrogen generated at the DBFC 200 is constantly and stably supplied to the anode of the PEMFC 400.

The PEMFC 400 generates electric energy as hydrogen supplied to the anode and external air supplied to the cathode are electrochemically reacted. The external air is supplied to the cathode by the air supply means 600. External air is supplied to the DBFC 200 and the PEMFC 400 by the air supply means 600.

Electric energy generated at the DBFC 200 and the PEMFC 400 is supplied to a load or is stored.

The step of stopping the fuel cell system is as follows.

First, a driving of the DBFC 200 is stopped, and a fuel and a product remaining at an inner side of the DBFC 200 and at the fuel circulation supply means are purged to the fuel tank 110. That is, the driving of the DBFC 200 is stopped, and then the recycle pump 350 is continuously operated thus to introduce liquid remaining at the gas/liquid separator 320 into the fuel tank 110. Then, the three-way valve 372 is controlled thus to connect the third line 371 and the fuel tank 110, and the first purge valve 375 of the hydrogen reservoir 520 is closed thus to increase an inner pressure of the hydrogen reservoir 520. By the increased inner pressure, liquid remaining at the hydrogen reservoir 520 is purged to the fuel tank 110. The first purge valve 375 is opened under a general operation state.

The liquid remaining at the hydrogen reservoir 520 is purged to the fuel tank 110 by reversely rotating the fuel pump 340.

If a fuel or a byproduct remains at the electrolyte reservoir 120 or at the fuel circulation supply means, the fuel or byproduct are solidified in the fuel circulation supply means according to a temperature change thereby to lower an efficiency of the system.

When only the PEMFC 400 is operated under a state that the driving of the DBFC 200 is stopped, the PEMFC 400 is operated by using hydrogen remaining at the connection line 510 and the hydrogen reservoir 520 as a fuel. As the driving of the DBFC 200 is stopped and then the PEMFC 400 is operated, electric energy is generated and thereby the recycle pump 350 and the fuel pump 340 are operated. According to this, liquid remaining at the electrolyte reservoir 120 or the fuel circulation supply means is purged, and components constituting the air supply means 600 are operated.

If hydrogen remaining at the connection line 510 or the hydrogen reservoir 520 was completely consumed at the PEMFC 400 and thereby electric energy for performing a purge driving or operating other components is deficient, electric energy stored in the supplementary battery is used.

When the purge driving is completed, the entire driving is stopped.

As the entire driving is stopped by the above process, hydrogen generated at the DBFC 200 can be utilized as maximum as possible and solidified foreign materials do not exist in the system thereby to maintain a function of the system.

In the method for controlling the fuel cell system, an oxygen concentration and a hydrogen concentration of a space where the system is installed are measured. If the measured concentration is more than a preset value, a warning is displayed. According to this, a danger that a user is suffocated due to an oxygen deficiency or an accident is caused due to a high hydrogen concentration can be prevented, thereby enhancing a stability of the system. Also, when the supplementary battery for charging a part of electric energy generated at the fuel cell system is excessively charged, a warning is displayed thus to take a proper reaction and thereby the stability of the system is more enhanced.

In the fuel cell system of the present invention, the electrolyte reservoir 120 and the first line 310 are connected by the third line 371, thereby supplying electrolyte aqueous solution to a fuel supplied to the anode of the DBFC 200 through the first line 310 during the operation or purging aqueous solution of the electrolyte reservoir 120 to the fuel tank 110 through the first line 310 at the time of stopping the driving. According to this, the structure of the fuel circulation supply means 300 is simplified, and the structure of the inlet/outlet of the fuel tank 110 is simplified.

INDUSTRIAL APPLICABILITY

As aforementioned, in the fuel cell system and the controlling method thereof according to the present invention, a fuel of the DBFC is circulation-supplied thus to maximize a fuel usage. Also, since hydrogen generated at the anode of the DBFC is used as a fuel source of the PEMFC, an efficiency of electric energy outputted from the system based on a fuel supplied to the system is increased and the entire system is more simplified.

Additionally, since a pressure and an amount of hydrogen generated at the anode of the DBFC are controlled by the hydrogen control means in correspondence to a pressure and an amount required by the PEMFC thus to be supplied to the PEMFC, the system is operated more stably and effectively and the stability of the system is enhanced.

Also, since the DBFC and the PEMFC are sequentially stopped at the time of stopping the entire system, hydrogen remaining in the system except the fuel tank is utilized as maximum as possible thus to perform a purge-driving of the system. Therefore, a fuel usage amount is minimized and a system efficiency is increased.

Additionally, since an oxygen concentration and a hydrogen concentration are measured thus to be informed to the user while the system is operated and an excessive charge of electric energy is prevented, the user's safety is more increased.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A fuel cell system comprising:
    a fuel storage means for storing a fuel;
    a DBFC;
    a fuel circulation supply means for circulation-supplying a fuel to an anode of the DBFC from the fuel storage means;
    a PEMFC receiving hydrogen generated from the anode of the DBFC as a fuel;
    a hydrogen control means for controlling hydrogen generated from the anode of the DBFC in correspondence to an amount required by the PEMFC and thereby supplying the hydrogen to the PEMFC; and
    an air supply means for supplying air to a cathode of the DBFC and a cathode of the PEMFC.

2. The system of claim 1, wherein the fuel storage means includes:
    a fuel tank where a power fuel and water are contained; and
    an electrolyte reservoir for containing an electrolyte aqueous solution.

3. The system of claim 1, wherein the fuel tank is a single tank in which a power fuel, water, and the electrolyte aqueous solution are contained.

4. The system of claim 2, wherein the fuel circulation supply means further comprises:
    a first line for connecting the fuel tank and the anode of the DBFC;
    a gas/liquid separator for separating a byproduct generated at the anode of the DBFC after a reaction into gas and liquid;
    a second line for connecting the gas/liquid separator and the fuel tank and thereby guiding a liquid byproduct of the gas/liquid separator to the fuel tank;
    a fuel pump mounted at the first line;
    a recycle pump mounted at the second line;
    a first discharge line connected to the electrolyte reservoir for discharging gas contained in the electrolyte reservoir, and a first purge valve provided at the first discharge line to open and close the first discharge line; and
    an electrolyte supply means for supplying an electrolyte to the anode of the DBFC.

5. The system of claim 4, wherein the electrolyte supply means includes:
    a third line for connecting the electrolyte reservoir and the first line;
    a three-way valve mounted at a portion that the first line and the third line are connected to each other, for controlling a flow direction of a fluid; and
    a fourth line for connecting an outlet of the cathode of the DBFC and the electrolyte reservoir.

6. The system of claim 4, wherein the second line is provided with a first valve for preventing a fuel of the fuel tank from backwardly flowing to the gas/liquid separator.

7. The system of claim 4, wherein the second line is provided with a filter for filtering a solidified by product.

8. The system of claim 2, wherein the power fuel is one of $NaBH_4$ or $KBH_4$, and the electrolyte aqueous solution includes one of NaOH or KOH.

9. The system of claim 6, wherein the hydrogen control means includes:
    a connection line for connecting a gas/liquid separator constituting the fuel circulation supply means and the anode of the PEMFC, and flowing hydrogen generated at the DBFC after a reaction to the PEMFC;
    a hydrogen reservoir connected to the connection line, for temporarily storing hydrogen that flows through the connection line;
    a main gas valve unit mounted at the connection line between the hydrogen reservoir and the PEMFC, for controlling a hydrogen pressure as a certain degree so that hydrogen of the hydrogen reservoir can be supplied to the cathode of the PEMFC with a certain amount; and a hydrogen conduit open/close unit for allowing/shielding a hydrogen flow into the hydrogen reservoir by a pressure difference between inside of the connection line positioned at an inlet of the hydrogen reservoir and inside of the connection line positioned at an outlet of the hydrogen reservoir.

10. The system of claim 9, wherein the hydrogen conduit open/close unit includes:

a first pressure sensor mounted at the connection line positioned between the gas/liquid separator and the hydrogen reservoir, for sensing a pressure;

a second pressure sensor mounted at the connection line between the main gas valve unit and the hydrogen reservoir, for sensing a pressure;

a second valve mounted at the connection line between the first pressure sensor and the hydrogen reservoir, for controlling hydrogen flowing in the connection line; and a control means for opening and closing the second valve by a pressure difference detected by the first and second pressure sensors.

11. The system of claim 10, further comprising a compressor provided at the connection line positioned between the first pressure sensor and the second valve, the first compressor for compression-pumping hydrogen.

12. The system of claim 10, wherein the main gas valve unit includes:

a third valve mounted at the connection line between the hydrogen reservoir and the PEMFC, for controlling a flow amount of hydrogen;

a regulator mounted at the connection line between the third valve and the PEMFC, for supplying hydrogen of a certain pressure to the anode of the PEMFC;

a second discharge line connected to the connection line between the hydrogen reservoir and the third valve; and a relief valve mounted at the second discharge line, for controlling a pressure when an excessive pressure is applied.

13. The system of claim 12, wherein a third discharge line for discharging a byproduct after a reaction is connected to an outlet of the anode of the PEMFC, and a second purge valve is mounted at the third discharge line.

14. The system of claim 1, wherein the air supply means includes:

an air distributor for distributing air;

a first distribution line for connecting the air distributor and the cathode of the DBFC;

a second distribution line for connecting the air distributor and the cathode of the PEMFC;

an air introducing line connected to the air distributor, for introducing external air to the air distributor;

an external air compressor mounted at the air introducing line, for compression-pumping external air; and an air filter mounted at the air introducing line, for filtering introduced air.

15. The system of claim 13, wherein the PEMFC is provided with a fourth discharge line at an outlet of the cathode thereof, the fourth discharge line for discharging a byproduct generated at the cathode after a reaction outwardly, and a humidity exchanger for performing a humidity exchange between air introduced into the cathode and a byproduct discharged to outside is connected between the fourth discharge line and the second distribution line.

16. The system of claim 15, wherein the fourth discharge line is provided with an evaporator for evaporating water discharged from the fourth discharge line.

17. A method for controlling a fuel cell system comprising:

driving a DBFC;

controlling hydrogen, a byproduct generated at an anode of the DBFC after a reaction as a preset amount; and driving a PEMFC by receiving hydrogen having an amount set in the hydrogen controlling step and thus using the hydrogen as a fuel.

18. The method of claim 17, wherein in the step of driving a DBFC, a step of supplying a fuel to an anode of the DBFC includes:

making a fuel of an aqueous solution in a fuel tank by injecting a power fuel and water thereto;

containing electrolyte aqueous solution in an electrolyte reservoir;

pumping the fuel of an aqueous solution and thereby supplying the anode of the DBFC with the electrolyte aqueous solution;

separating a byproduct generated at the anode after a reaction into gas and liquid; and pumping the separated liquid and thereby supplying to the fuel tank.

19. The method of claim 18, wherein in the step of driving a DBFC, a byproduct generated at a cathode of the DBFC after a reaction is supplied to the electrolyte reservoir thus to be separated into gas and liquid, the electrolyte aqueous solution is supplied to the anode of the DBFC at the time of operating the DBFC, and the electrolyte reservoir is closed thus to purge the liquid of the electrolyte reservoir to the fuel tank at the time of stopping the DBFC.

20. The method of claim 17, wherein external air is introduced into an air conduit and the air conduit is diverged into separate first and second conduits, through which air is respectively supplied to cathodes of the DBFC and the PEMFC.

21. The method of claim 17, wherein in the step of driving a DBFC, an amount of hydrogen generated at the anode of the DBFC after a reaction is controlled according to a supply amount of a fuel supplied to the anode.

22. The method of claim 17, wherein the step of controlling hydrogen includes:

respectively measuring an inlet pressure and an outlet pressure of a hydrogen reservoir, the inlet pressure being measured where hydrogen generated at the anode of the DBFC is introduced thus to be stored, and the outlet pressure being measured where the stored hydrogen is supplied to an anode of the PEMFC;

comparing the inlet pressure and the outlet pressure; and continuously supplying hydrogen generated at the anode of the DBFC to the hydrogen reservoir when the inlet pressure is greater than the outlet pressure, and shielding a hydrogen supply to the hydrogen reservoir when the inlet pressure is less than the outlet pressure.

23. The method of claim 17, wherein the step of controlling hydrogen includes:

measuring an outlet pressure of a hydrogen reservoir, the outlet pressure being measured where hydrogen generated at the anode of the DBFC and introduced to the inlet of the hydrogen reservoir is supplied to the anode of the PEMFC;

measuring a purge cell voltage (PCV) of the PEMFC;

shielding a hydrogen supply from the hydrogen reservoir to the PEMFC when the outlet pressure is less than a preset value, and comparing the PCV with a preset value when the outlet pressure is more than the preset value; and shielding a hydrogen supply from the hydrogen reservoir to the PEMFC when the PCV is greater than the preset value, and shielding a hydrogen supply from the hydrogen reservoir to the PEMFC after a preset time lapses when the PCV is less than or the same as the preset value.

24. The method of claim 17, further comprising measuring an oxygen concentration and a hydrogen concentration of outside of the fuel cell system while the fuel cell system is operated, and displaying a visual or an audible warning when the measured oxygen or hydrogen concentration is more or less than a preset value and stopping the fuel cell system.

25. The method of claim 17, further comprising charging a supplementary batter using a part of electric energy generated between the DBFC and the PEMFC, and displaying a visual or an audible warning when a charged value of the supplementary battery is more than a preset value so as to stop the charging.

26. The method of claim 24, wherein the step of stopping the fuel cell system includes:

stopping the DBFC, and then driving the PEMFC by hydrogen remaining between the DBFC and the PEMFC;

recollecting a fuel and a byproduct remaining between the DBFC and a fuel tank to the fuel tank by electric energy generated at the PEMFC;

measuring hydrogen remaining between the DBFC and the PEMFC, continuously driving the PEMFC when the measured value is more than a preset value and charging a supplementary battery with the generated electric energy, and stopping the PEMFC when the measured value is less than or the same as the preset value.

27. The method of claim 26, wherein the PEMFC is stopped after being operated for a preset time.

28. The method of claim 26, wherein in the step of recollecting a fuel and a byproduct remaining between the DBFC and a fuel tank to the fuel tank by electric energy generated at the PEMFC, electric energy charged at the supplementary battery is used when the PEMFC is stopped due to a deficiency in a remaining amount of hydrogen.

* * * * *